A. T. DEILY.
DUST COLLECTOR.
APPLICATION FILED APR. 12, 1921.
1,408,693.
Patented Mar. 7, 1922.
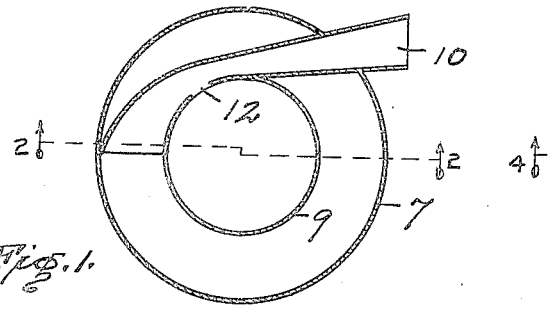
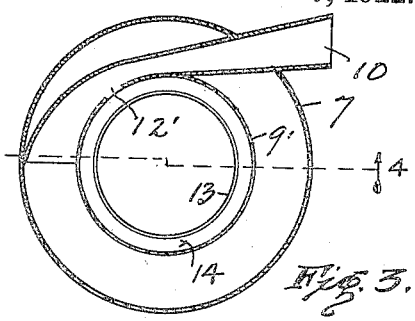
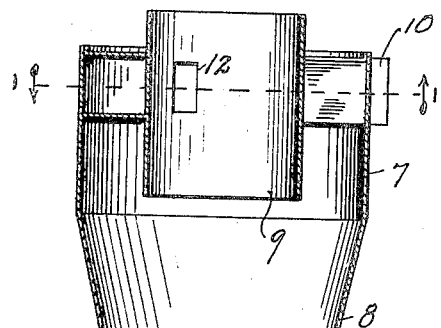
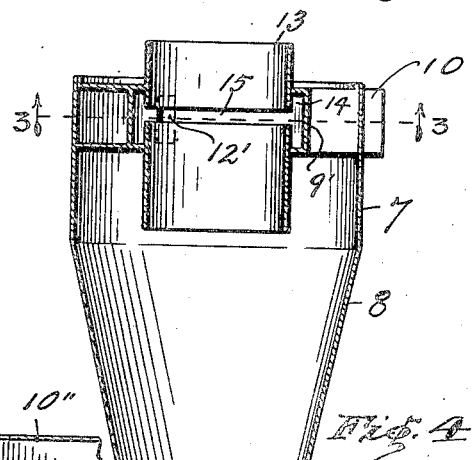
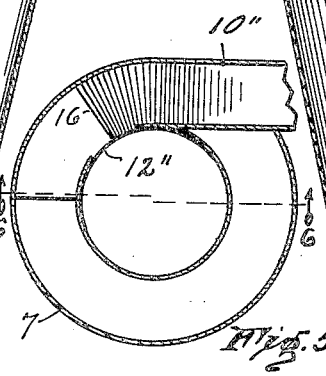
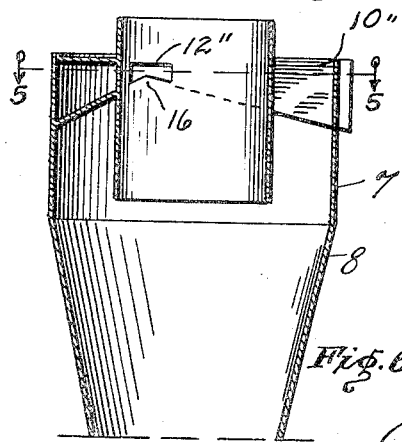
Inventor,
Arthur T. Deily,
By
Joseph A. Minturn
Attorney.

UNITED STATES PATENT OFFICE.

ARTHUR T. DEILY, OF INDIANAPOLIS, INDIANA.

DUST COLLECTOR.

1,408,693.  Specification of Letters Patent.  Patented Mar. 7, 1922.

Application filed April 12, 1921. Serial No. 460,714.

*To all whom it may concern:*

Be it known that I, ARTHUR T. DEILY, a citizen of the United States, residing at Indianapolis, in the county of Marion and State of Indiana, have invented new and useful Improvements in Dust Collectors, of which the following is a specification.

This invention relates to dust collectors for use in factories, mills, and other places where it is necessary or desirable to remove dust particles floating in the air used in the operations conducted there. Such mechanism is essential in flour-mills not alone to save flour that would be wasted unless removed, but also to avoid the white deposit that would result on surrounding objects and more particularly to remove the liability of explosions from spontaneous combustion likely to occur from the loading of the air with flour-dust. The method in common use heretofore in flour-mills requires the air to be passed through two or more dust collectors each of which removes a part of the dust and practically all of it may be removed if the separations are repeated a sufficient number of times but at the expense of time and money for the accomplishment.

The object of this invention is to provide a dust collector in which the principle of the Venturi tube is employed to produce vacuum enough in the injector-nozzle to draw the dust-ladened air from the center of the hood into the nozzle continuously until the dust is eliminated.

A further object is to provide a simple device which will be inexpensive to construct and install and to operate, and I accomplish all of the above, and other objects which will hereinafter appear, by the mechanism illustrated in the accompanying drawing, in which—

Fig. 1 is a horizontal section of a simple form of my invention on the line 1—1 of Fig. 2. Fig. 2 is a vertical section on the line 2—2 of Fig. 1. Fig. 3 is a horizontal section on the line 3—3 of Fig. 4, and Fig. 4 is a vertical section on the line 4—4 of Fig. 3 of a modified form of my device. Fig. 5 is a horizontal section on the line 5—5 of Fig. 6, and Fig. 6 is a vertical section on the line 6—6 of Fig. 5 of another modified form.

In the embodiment of my invention shown in Figs. 1 and 2, the hood 7 and depending cone 8 are of usual construction and relative proportions, and located within the hood is a vertical tube 9, which is concentric with the hood, and preferably extends a short distance above the upper edge of the hood and nearly to the bottom of the hood. Entering through a suitable opening provided for the purpose in the hood is a nozzle 10 located between the hood and tube. Its inner wall contacts the tube at a tangent and from thence on to the mouth of the nozzle the wall of the tube forms the inner curved wall of the nozzle. The outer and vertical wall of the nozzle is oblique to the inner one, their closest approach being approximately opposite or a little farther toward the mouth of the nozzle from where the inner wall meets the tube, and from this narrowest place the outer wall departs from the inner one in a curve as shown in Fig. 1, thereby restricting the cross sectional area of the nozzle on the principle of the Venturi tube. The outer end of the nozzle is connected with a blower-fan (not shown) which forces a current of air through the nozzle into the hood. This is air ladened with dust to be removed and the momentum of the air driven obliquely against the inner wall of the hood and cone creates a whirl within said parts that carries the dust by centrifugal action against said inner walls. The restricted outlet below caused by the taper of the cone forces the air at the center from which much of the dust has been centrifugally extracted, out through tube 9. This air is still whirling which drives its dust centrifugally against the inner wall of the tube, and I take advantage of this fact, and also of the partial vacuum in the nozzle produced by its Venturi shape, to return the dust-ladened air to the nozzle for re-cleaning, by forming an opening 12 from the tube into the nozzle as shown. The air with dust in it is thus worked over and over again until there is no dust left to respond centrifugally and the purified air passes to atmosphere through the middle of tube 9.

Because of the tendency, by reason of the upward movement of the air crowding out through tube 9, to charge the top of the nozzle stronger than its lower portion thereby reducing the efficiency, I have found that the upward movement is changed to one in a horizontal plane by introducing a second tube 13, (see Figs. 3 and 4) within the tube 9' concentrically of the latter but smaller, to provide an air-space 14 between them. This second tube has an annular slot 15, which crosses the opening 12' in the tube 9', as shown in Fig. 4. The space 14 is closed by members 18 and 19, in the same planes with the top and bottom walls of the nozzle, and the portions of tube 9' beyond 18 and 19 are removed as shown in Fig. 4.

In the modification shown in Figs. 5 and 6, the vertical sides of the nozzle 10" are parallel and the Venturi restriction is made by sloping the bottom upwardly from each direction to a closest portion 16, opposite opening 12", here shown as formed near the top of the nozzle. The operation is substantially the same as in the construction shown in Figs. 1 and 2, this being merely another form of Venturi tube.

While I have shown the best forms of my device now known to me, the modifications illustrated and described show that variations are possible in its details without departing from the spirit of the invention, and I therefore do not desire to be limited any more than is required by the appended claims, and what I claim as new, is—

1. In a dust collector, a hood, a tube within the hood, a nozzle passing through the wall of the hood and discharging in the space between the hood and tube, said nozzle being restricted in the form of a Venturi tube and the first tube having a discharge opening into the nozzle.

2. In a dust collector, a hood, a tube within the hood, a nozzle passing through the wall of the hood and discharging in the space between the hood and tube, said nozzle being restricted in the form of a Venturi tube, the first tube having a discharge opening into the nozzle, and an auxiliary tube within the first tube separated therefrom by an air-space and having a discharge opening into said space.

3. In a dust collector, a hood, an inner tube, a nozzle discharging between them, the inner tube having a discharge opening into the nozzle and means in the nozzle to produce a forced draft into it through said opening.

4. In a dust collector, a hood, an inner tube, a nozzle discharging between them, the inner tube having a discharge opening into the nozzle, means to produce a forced draft through said opening into the nozzle and means to equalize the discharge from the tube into the nozzle.

5. In a dust collector, a hood, an inner tube, and a nozzle in the form of a Venturi tube discharging between them, said inner tube having a discharge opening into the nozzle.

6. In a dust collector, a hood, an inner tube, a nozzle in the form of a Venturi tube discharging between them, said inner tube having a discharge opening into the nozzle, and means to equalize the discharge from the tube into the nozzle.

7. In a dust collector, a hood, a tube within the hood, a nozzle passing through the wall of the hood and discharging into the space between the hood and tube, said nozzle being restricted in the form of a Venturi tube, and an auxiliary tube within the first tube separated therefrom by an air-space, said auxiliary tube having a discharge into the air-space and the first tube having a discharge from the air-space into the nozzle, and said air-space being closed except for the discharge into it from the auxiliary tube and from it into the nozzle.

Signed at Indianapolis, Indiana, this the 9th day of April, 1921.

ARTHUR T. DEILY.